(12) United States Patent
Liu et al.

(10) Patent No.: US 11,755,728 B2
(45) Date of Patent: Sep. 12, 2023

(54) SYSTEMS, METHODS, AND MEDIA FOR ANALYZING STRUCTURED FILES FOR MALICIOUS CONTENT

(71) Applicant: McAfee, LLC, San Jose, CA (US)

(72) Inventors: Qiang Liu, Fremont, CA (US); Chong Xu, Sunnyvale, CA (US); Praveen Kumar Amritaluru, Chennai (IN); Mayank Bhatnagar, Bangalore (IN)

(73) Assignee: McAfee, LLC, San Jose, CA (US)

( * ) Notice: Subject to any disclaimer, the term of this patent is extended or adjusted under 35 U.S.C. 154(b) by 90 days.

(21) Appl. No.: 17/167,895

(22) Filed: Feb. 4, 2021

(65) Prior Publication Data
US 2022/0179953 A1 Jun. 9, 2022

(30) Foreign Application Priority Data
Dec. 8, 2020 (IN) .............................. 202011053429

(51) Int. Cl.
*G06F 21/55* (2013.01)
(52) U.S. Cl.
CPC ...... *G06F 21/554* (2013.01); *G06F 2221/033* (2013.01)
(58) Field of Classification Search
CPC . G06F 21/554; G06F 2221/033; G06F 21/562
See application file for complete search history.

(56) References Cited

U.S. PATENT DOCUMENTS

| | | | | |
|---|---|---|---|---|
| 10,192,052 B1* | 1/2019 | Singh | ................... | G06F 21/562 |
| 10,394,686 B2* | 8/2019 | Soeder | ................. | G06F 21/565 |
| 10,491,627 B1* | 11/2019 | Su | ......................... | H04L 63/145 |
| 11,176,251 B1* | 11/2021 | Plantenga | ............. | G06F 21/564 |
| 2011/0247072 A1* | 10/2011 | Staniford | ............ | H04L 63/1491 726/24 |
| 2021/0397703 A1* | 12/2021 | Stocks | .................... | G06F 21/53 |
| 2021/0406372 A1* | 12/2021 | Albero | .................... | G06F 21/53 |

FOREIGN PATENT DOCUMENTS

WO WO 2021/018929 A1 * 2/2021 ............... G06N 3/08

* cited by examiner

*Primary Examiner* — Christopher A Revak
(74) *Attorney, Agent, or Firm* — Byrne Poh LLP

(57) ABSTRACT

Mechanisms for analyzing a structured file for malicious content are provided, comprising: parsing the structured file into a plurality of portions; selecting a selected portion of the portions; checking the selected portion to determine if at least one pre-condition is met; and in response to determining that the at least one pre-condition is met: decoding the selected portion to form a decoded portion; and checking the decoded portion to determine if it is malicious. In some embodiments: the at least one pre-condition can be changed; the structured file is a MICROSOFT OFFICE XML file; the selected portion is a file; the at least one pre-condition checks at least one attribute of the selected portion; decoding the selected portion comprises decompressing the selected portion; and/or checking the decoded portion to determine if it is malicious comprises checking whether a previously decoded portion of the structure file meets at least one condition.

17 Claims, 4 Drawing Sheets

SYSTEMS, METHODS, AND MEDIA FOR ANALYZING STRUCTURED FILES FOR MALICIOUS CONTENT

CROSS-REFERENCE TO RELATED APPLICATION

This application claims the benefit of Indian Patent Application No. 202011053429, filed Dec. 8, 2020, which is hereby incorporated by reference herein in its entirety.

BACKGROUND

Certain structured files, such as MICROSOFT OFFICE XML files, contain an archive of different files, any of which can contain compressed and hidden exploit code that can be used to attack one or more devices on a computer network.

One technique that can be used to identify exploit code in a structured file is to parse the structured file into different portions, decode (e.g., decompress) each portion, and then scan the decoded portions for exploit code signatures.

Decoding every portion is performance intensive and can significantly and negatively increase latency and throughput.

Accordingly, new mechanisms for analyzing structured files for malicious content are desirable.

SUMMARY

In accordance with some embodiments, systems, methods, and media for analyzing structured files for malicious content are provided.

In some embodiments, systems for analyzing a structured file for malicious content are provided, the systems comprising: a memory; and at least one hardware processor that is coupled to the memory and configured to: parse the structured file into a plurality of portions; select a selected portion of the plurality of portions; check the selected portion to determine if at least one pre-condition is met; and in response to determining that the at least one pre-condition is met: decode the selected portion to form a decoded portion; and check the decoded portion to determine if it is malicious. In some embodiments of these systems, the at least one pre-condition can be changed; the structured file is a MICROSOFT OFFICE XML file; the selected portion is a file; the at least one pre-condition checks at least one attribute of the selected portion; decoding the selected portion comprises decompressing the selected portion; and/or checking the decoded portion to determine if it is malicious comprises checking whether a previously decoded portion of the structure file meets at least one condition.

In some embodiments, methods for analyzing a structured file for malicious content are provided, the methods comprising: parsing the structured file into a plurality of portions; selecting a selected portion of the plurality of portions; checking the selected portion to determine if at least one pre-condition is met; and in response to determining that the at least one pre-condition is met: decoding the selected portion to form a decoded portion; and checking the decoded portion to determine if it is malicious. In some embodiments of these methods: the at least one pre-condition can be changed; the structured file is a MICROSOFT OFFICE XML file; the selected portion is a file; the at least one pre-condition checks at least one attribute of the selected portion; decoding the selected portion comprises decompressing the selected portion; and/or checking the decoded portion to determine if it is malicious comprises checking whether a previously decoded portion of the structure file meets at least one condition.

In some embodiments, non-transitory computer-readable media containing computer executable instructions that, when executed by a processor, cause the processor to perform a method for analyzing a structured file for malicious content are provided, the method comprising: parsing the structured file into a plurality of portions; selecting a selected portion of the plurality of portions; checking the selected portion to determine if at least one pre-condition is met; and in response to determining that the at least one pre-condition is met: decoding the selected portion to form a decoded portion; and checking the decoded portion to determine if it is malicious. In some embodiments of these non-transitory computer-readable media: the at least one pre-condition can be changed; the structured file is a MICROSOFT OFFICE XML file; the selected portion is a file; the at least one pre-condition checks at least one attribute of the selected portion; decoding the selected portion comprises decompressing the selected portion; and/or checking the decoded portion to determine if it is malicious comprises checking whether a previously decoded portion of the structure file meets at least one condition.

DETAILED DESCRIPTION

Figure 1A:
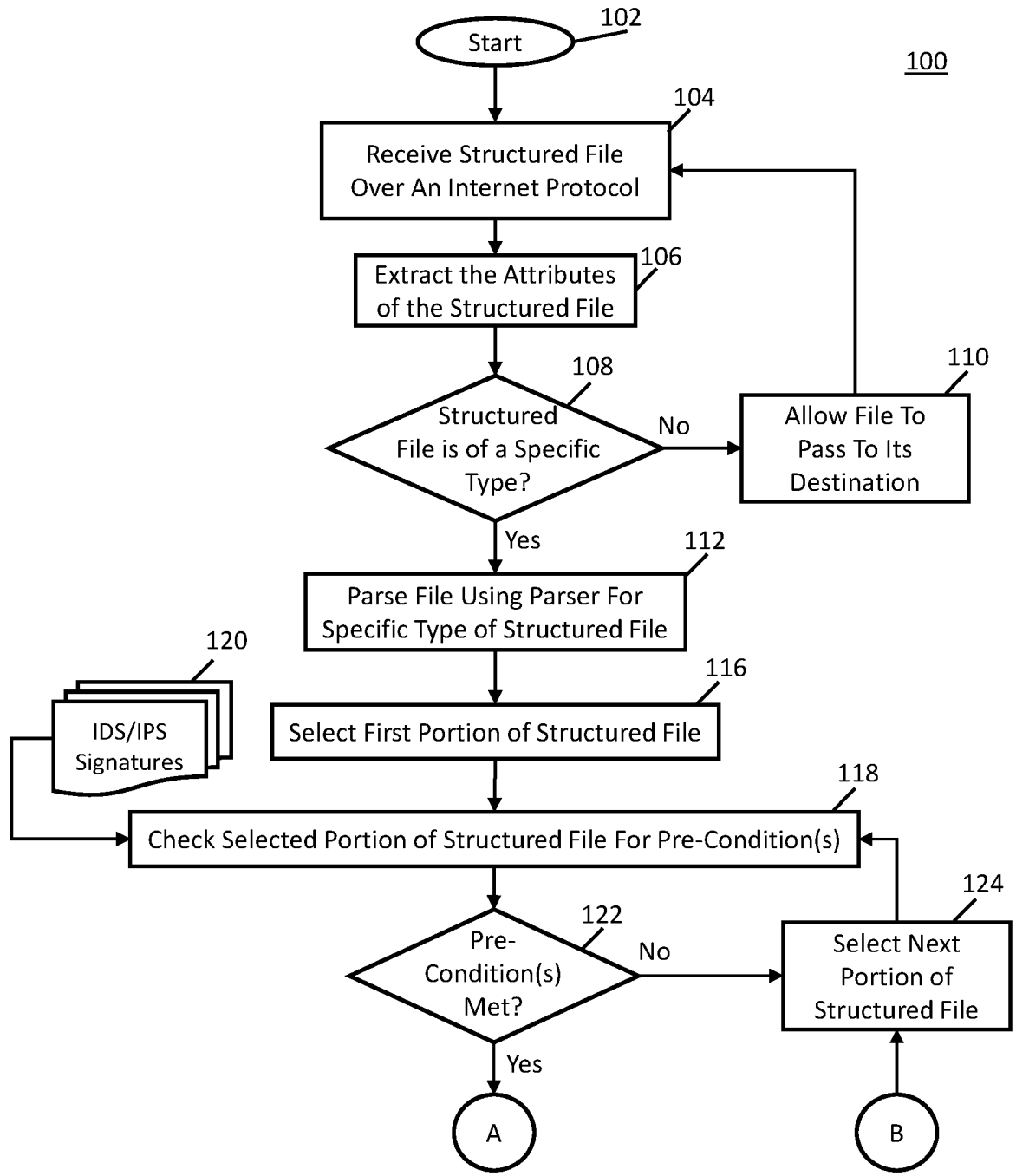
FIGS. 1A and 1B show an example of a process for analyzing structured files for malicious content in accordance with some embodiments.

In accordance with some embodiments, mechanisms, which can include systems, methods, and media, for analyzing structured files for malicious content are provided. In some embodiments, these mechanisms can include parsing a structured file into a plurality of portions, and then for each of the plurality of portions checking one or more pre-conditions, and if the one or more pre-conditions are met, decoding the portion and checking the decoded (e.g., decompressed) portion for signs of maliciousness, which, if present, cause the portion or the whole structured file to be acted upon (e.g., blocked, flagged, etc.). By checking for pre-condition(s) in this manner, the mechanism described herein can significantly reduce analysis processing time, and hence improve latency and throughput.

Turning to FIG. 1, an example 100 of a process for analyzing a structured file for malicious content in accordance with some embodiments is illustrated. As shown, process 100 can be executed by any one or more suitable devices. For example, in some embodiments, process 100 can be executed by a router, a gateway, a firewall, a proxy, a network appliance, an endpoint (e.g., computer, desktop, laptop, mobile phone, tablet computer, set top box, smart appliance, etc.), a server, and/or any other suitable device capable of performing any one or more of the functions described herein.

As shown, after process 100 begins at 102, the process receives a structured file over an Internet protocol at 104. The structured file can be received over any suitable Internet protocol, such as hypertext transfer protocol (http), file transfer protocol (ftp), simple mail transfer protocol (smtp), and/or any other suitable protocol, in some embodiments. The structured file can be any suitable structured file such as a MICROSOFT OFFICE XML archive file, zip file, OPEN OFFICE XML file, and/or any other suitable file that can include portions (such as files) that can be analyzed for malicious content as described herein. The structured file can be received in any suitable manner in some embodiments. For example, in some embodiments, any suitable network device, such as a router, a gateway, a firewall, a proxy, a network appliance, an endpoint (e.g., computer, desktop, laptop, mobile phone, tablet computer, set top box, smart appliance, etc.), server and/or any other suitable device can intercept the file as the file passes through a network or network interface.

Next, at 106, process 100 extracts the attributes of the structured file. The attributes of the structure file can be extracted in any suitable manner using any suitable mechanism, in some embodiments. For example, in some embodiments, the attributes of the structured file can be extracted using a generic protocol parser. Any suitable generic protocol parser can be used, and this generic protocol parser can extract the attributes from the structured file in any suitable manner, in some embodiments. For example, SNORT, available from CISCO SYSTEMS, INC. of San Jose, Calif., can be used as a generic protocol parser to extract the attributes of the structured file in some embodiments.

Then, at 108, process 100 determines if the structured file is of a specific type of structured file. In some embodiments, process 100 can be configured to determine if the structured file is any suitable specific type of structured file. For example, in some embodiments, the process can be configured to determine if the file is a MICROSOFT (MS) OFFICE XML archive file.

If it is determined that the structured file is not of the specific type of structured file, then, at 110, process 100 allows the structured file to pass to its destination and loop back to 104 to receive the next structured file. In some embodiments, process 100 can allow the structured file to pass to its destination in any suitable manner. For example, in some embodiments, process 100 can transmit packets making up the structured file on a network.

If it is determined at 108 that the structured file is of the specific type of structured file (e.g., the structured file is an MS OFFICE XML file), then, at 112, process 100 parses the structured file using a parser for the specific type of structured file (e.g., an MS OFFICE XML file parser). Any suitable parser can be used, and this parser can parse the structured file in any suitable manner, in some embodiments. For example, in some embodiments, when the specific type of structured file is an MS OFFICE XML file, 7-ZIP, available at www.7-zip.com, can be used to parse the structured file.

Next, at 116, process 100 selects a first portion of the structured file. This selection can be made in any suitable manner in some embodiments. For example, in some embodiments, the first portion of the structured file can be based on an order in which portions of the structured file are received, and/or based on any other suitable criteria or criterion. The portion of the structured file that is selected can be any suitable type of data structure, in some embodiments. For example, in some embodiments, the portion that is select can be a file within the structured file.

Next, at 118, process 100 checks the selected portion of the structured file for pre-condition(s). The process can check the selected portion for any suitable type and number of pre-conditions in some embodiments. In some embodiments, pre-condition(s) can be considered to be met when any suitable Boolean combination of the pre-condition(s) are met. For example, in some embodiments, two pre-conditions can be determined as being met only when each is met. As another example, in some embodiments, two pre-conditions can be determined as being met when either of the two pre-conditions is met.

Any suitable pre-condition(s) can be checked in some embodiments. For example, in some embodiments, process 100 can check to determine if any suitable attributes of the selected portion have any suitable values, range of values, value relative to a threshold, and/or any other suitable characteristic. As a more particular example, in some embodiments, process 100 can check the size of the selected portion, the name of the selected portion, a file extension associated with the selected portion, hypertext transfer protocol (http) headers associated with the selected portion, a file type associated with the selected portion, a file creation time associated with the selected portion, a length of extra field headers associated with the selected portion, a cyclic redundancy check (CRC) checksum associated with the selected portion, a compression type associated with the selected portion, and/or any other suitable attribute that could reveal that the selected portion may be malicious in some embodiments.

In some embodiments, the check at 118 can use any suitable one or more intrusion detection system (IDS) and/or intrusion prevention system (IPS) signatures 120.

In some embodiments, when the specific file type is an MS OFFICE XML archive file and the selected portion is a file in the archive, process 100 can check for the following pre-conditions for example:

1) That the file name of the selected portion matches a given string; and/or
2) That the compressed file size of the selected portion has a value in a given range.

Next, at 122, process 100 determines whether the pre-condition(s) checked at 118 have been met. If not, process 100 selects the next portion of the structed file at 124 and loops back to 118. The selection of the next portion of the structured file can be performed in any suitable manner, such as the manners for selecting the first portion of the structured file described above in connection with 116.

If process 100 determines at 122 that the pre-condition(s) checked at 118 have been met, then the process branches to 126 at which it decodes the selected portion of the structured file. Decoding the selected portion of the structured file at 126 can be performed in any suitable manner in some embodiments. For example, in some embodiments, the selected portion of the structured file can be unzipped, decompressed, decrypted, format decoded, and/or operated on by any other suitable decoding function as part of the decoding at 126. In some embodiments, some forms of the decoding (e.g., unzipping or decompressing) can be performed using 7-ZIP, available at www.7-zip.com.

Next, at 128, process 100 checks the decoded selected portion of the structured file for one or more conditions which indicate maliciousness. Any suitable type(s) of conditions can be checked in some embodiments. In some embodiments, maliciousness can be considered to be present when any suitable Boolean combination of conditions are met. For example, in some embodiments, when using two conditions, maliciousness can be considered to be present only when each of the two conditions is met. As another example, in some embodiments, when using two conditions, maliciousness can be considered to be present when either of the two conditions is met.

In some embodiments, the condition(s) at 128 can use any suitable one or more intrusion detection system (IDS) and/or intrusion prevention system (IPS) signatures 130.

In some embodiments, when the specific file type is an MS OFFICE XML archive file and the selected portion is a file in the archive, process 100 can check for the following condition for example: that the decoded selected portion contains a given string.

In some embodiments, the check at 128 can also take into consideration the result(s) of a check (e.g., at 128) on a previously selected portion of the structured file, such that advanced malware types which are hidden in different portions of the structured file can be detected. For example, in some embodiments, if a previously selected portion of the structured file had a name matching a given string and its decoded selected portion had a size matching a certain range AND a currently selected portion has a decoded selected portion matching a given signature, then a condition indicating maliciousness can be met at 128.

Next, at 132, process 100 determines whether the decoded selected portion of the structured file is malicious based on the check at 128. If the decoded selected portion is determined to be malicious, process 100 performs an action on the selected portion of the structured file, or performs an action on the whole structured file, at 134. Any suitable action can be performed in some embodiments. For example, in some embodiments, the selected portion can be blocked, quarantined, deleted, flagged, and/or acted upon in any other suitable manner.

If the decoded selected portion is determined to be not malicious at 132, or after performing an action at 134, process 100 loops back to 124.

Figure 2:
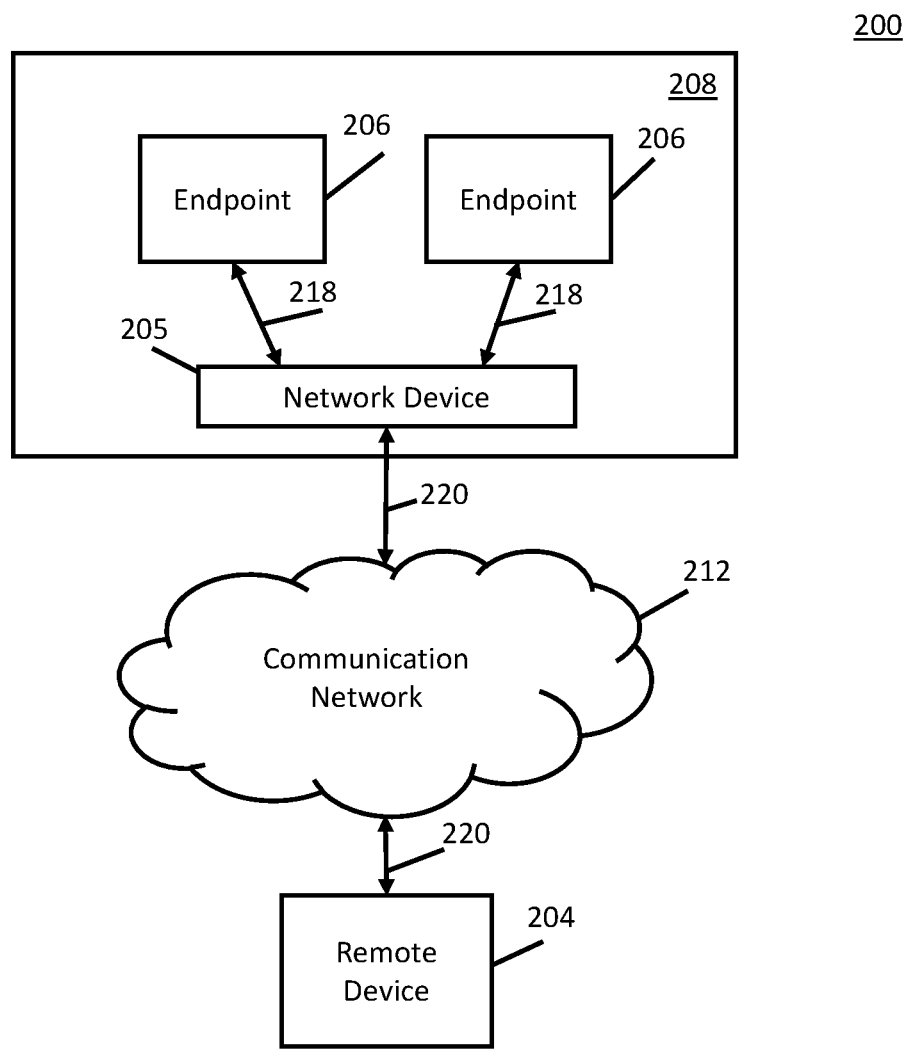
FIG. 2 shows an example of an architecture of interconnected components that can be used in accordance with some embodiments.

Turning to FIG. 2, an example 200 of an architecture of interconnected components that can be used in accordance with some embodiments of the disclosed subject matter is shown. As illustrated, architecture 200 can include a local area network (LAN) 208, endpoints 206, a network device 205, a communication network 212, and a remote device 204.

Although particular numbers of particular devices are illustrated in FIG. 2, any suitable number(s) of each device shown, and any suitable additional or alternative devices, can be used in some embodiments. For example, one or more additional devices, such as servers, computers, routers, networks, printers, cameras, Internet-of-Things devices, etc., can be included in LAN 208 in some embodiments.

Endpoints 206 can be any suitable devices in LAN 208 for receiving and processing structured files in some embodiments. For example, in some embodiments, endpoints 206 can be desktop computers, laptop computers, tablet computers, smart phones, cameras, servers, printers, smart speakers, smart displays, and/or any other device(s) capable of processing a structured file.

Network device 205 can be any suitable device for connecting other devices in LAN 208 (such as endpoints 206) to devices and/or networks outside LAN 208 in some embodiments. In some embodiments, network device 205 can perform part or all of the process illustrated in, and described in connection with, FIGS. 1A and 1B. In some embodiments, network device 205 can monitor traffic, including structured files, passing through it in any direction and block, quarantine, pass, and/or take any other action on traffic based on the analysis described above in connection with FIGS. 1A and 1B. In some embodiments, network device 205 may provide a firewall function, a routing function, and/or any other suitable function.

Communication network 212 can be any suitable combination of one or more wired and/or wireless networks in some embodiments. For example, in some embodiments, communication network 212 can include any one or more of the Internet, a mobile data network, a satellite network, a local area network, a wide area network, a telephone network, a cable television network, a WiFi network, a WiMax network, and/or any other suitable communication network.

In some embodiments, communication network 212 and the devices connected to it can form or be part of a wide area network (WAN).

Remote device 204 can be any suitable device sending one or more structured files to an endpoint 206 in LAN 208. For example, in some embodiments, remote device 204 can be a desktop computer, a laptop computer, a tablet computer, a smart phone, a smart display, a server, and/or any other suitable device.

Network device 205 and remote device 204 can be connected by one or more communications links 220 to communication network 212. These communications links can be any communications links suitable for communicating data among network device 205, remote device 204, and communication network 212, such as network links, dial-up links, wireless links, hard-wired links, routers, switches, any other suitable communications links, or any suitable combination of such links.

Network device 205 and endpoints 206 can be connected by one or more communications links 218. These communications links can be any communications links suitable for communicating data among network device 205 and endpoints 206, such as network links, dial-up links, wireless links, hard-wired links, routers, switches, any other suitable communications links, or any suitable combination of such links.

Figure 3:
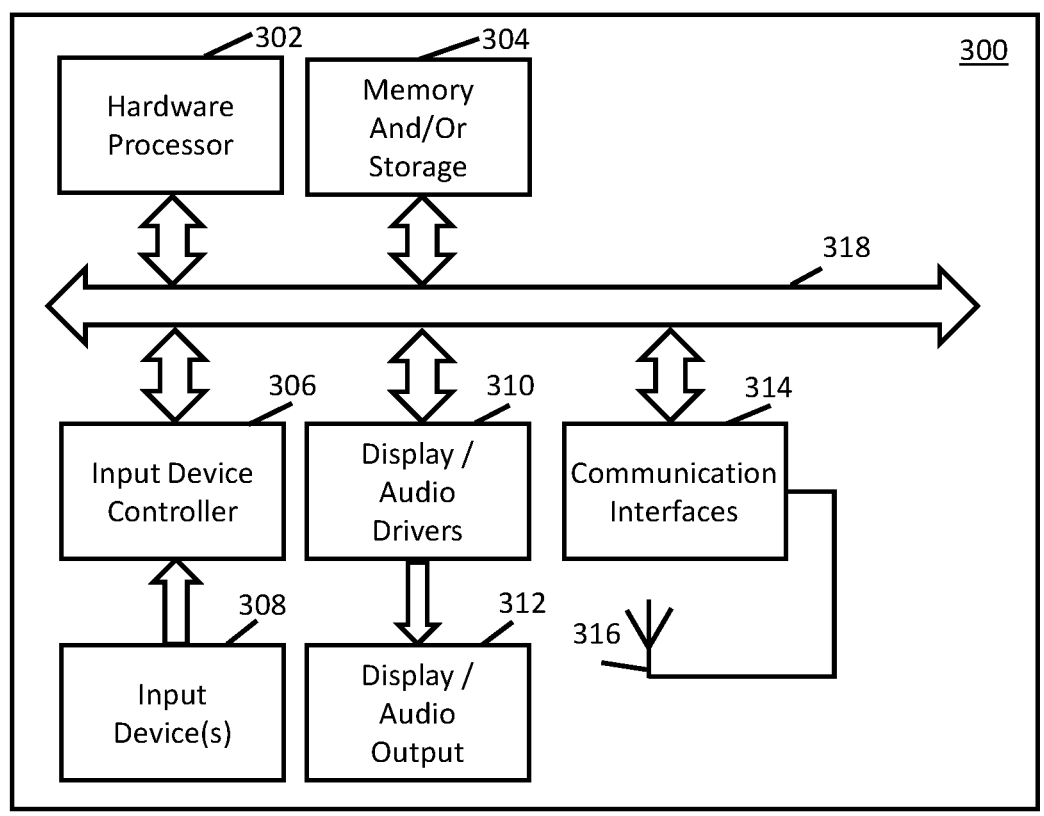
FIG. 3 shows an example of hardware that can be used for certain of the components shown in FIG. 2 in accordance with some embodiments.

Endpoints 206, network device 205, and remote device 204 can be implemented using any suitable hardware in some embodiments. For example, in some embodiments, endpoints 206, network device 205, and remote device 204 can be implemented using any suitable general-purpose computer or special-purpose computer(s). For example, network device 205 can be implemented using a special-purpose computer. Any such general-purpose computer or special-purpose computer can include any suitable hardware. For example, as illustrated in example hardware 300 of FIG. 3, such hardware can include a hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 304 can be any suitable memory and/or storage for storing programs, data, and/or any other suitable information in some embodiments. For example, memory and/or storage 304 can include random access memory, read-only memory, Flash memory, hard disk storage, optical media, and/or any other suitable memory.

Input device controller 306 can be any suitable circuitry for controlling and receiving input from input device(s) 308 in some embodiments. For example, input device controller 306 can be circuitry for receiving input from an input device 308, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving one or more display/audio output circuitries 312, such as an LCD display, a speaker, an LED, or any other type of output device.

Communication interface(s) 314 can be any suitable circuitry for interfacing with one or more communication networks, such as network 212 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can additionally or alternatively be included in hardware 300 in accordance with some embodiments.

Figure 1B:
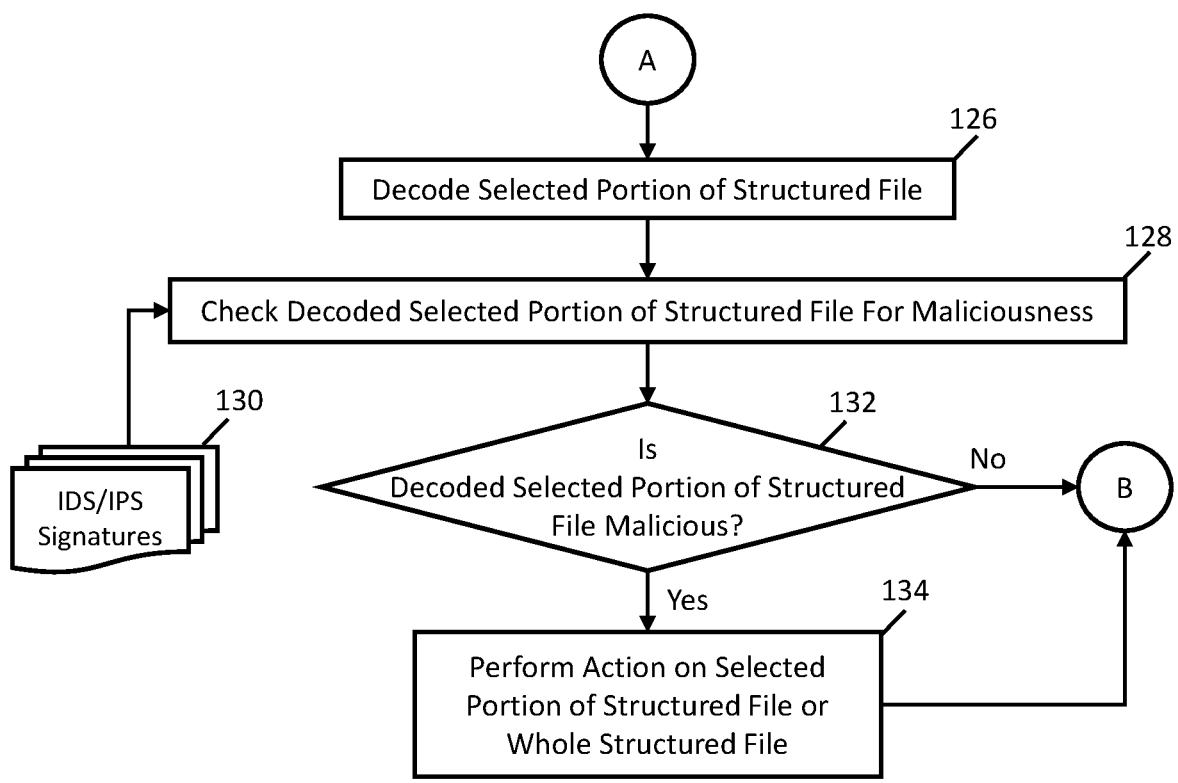

It should be understood that at least some of the above described blocks of the process of FIGS. 1A and 1B can be executed or performed in any order or sequence not limited to the order and sequence shown in and described in the figures. Also, some of the above blocks of the process of FIGS. 1A and 1B can be executed or performed substantially simultaneously where appropriate or in parallel to reduce latency and processing times. Additionally or alternatively, some of the above described blocks of the process of FIGS. 1A and 1B can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for analyzing a structured file which is not known to be free of or contain malicious content for malicious content, comprising:
 a memory; and
 at least one hardware processor that is coupled to the memory and configured to:
  parse the structured file into a plurality of portions;
  select a selected portion of the plurality of portions;
  check the selected portion to determine if at least one pre-condition is met,
 wherein the at least one pre-condition is the selected portion having one of a given name, a given file extension, and a given file type; and
  in response to determining that the at least one pre-condition is met:
   decode the selected portion to form a decoded portion; and
   check the decoded portion to determine if it is malicious.

2. The system of claim 1, wherein the at least one pre-condition can be changed.

3. The system of claim 1, wherein the structured file is an XML file.

4. The system of claim 1, wherein the selected portion is a file.

5. The system of claim 1, wherein decoding the selected portion comprises decompressing the selected portion.

6. The system of claim 1, wherein checking the decoded portion to determine if it is malicious comprises checking whether a previously decoded portion of the structure file meets at least one condition.

7. A method for analyzing a structured file which is not known to be free of or contain malicious content for malicious content, comprising:
 parsing, using a hardware processor, the structured file into a plurality of portions;
 selecting a selected portion of the plurality of portions;
 checking the selected portion to determine if at least one pre-condition is met, wherein the at least one pre-condition is the selected portion having one of a given name, a given file extension, and a given file type; and
 in response to determining that the at least one pre-condition is met:
  decoding the selected portion to form a decoded portion; and
  checking the decoded portion to determine if it is malicious.

8. The method of claim 7, wherein the at least one pre-condition can be changed.

9. The method of claim 7, wherein the structured file is an XML file.

10. The method of claim 7, wherein the selected portion is a file.

11. The method of claim 7, wherein decoding the selected portion comprises decompressing the selected portion.

12. The method of claim 7, wherein checking the decoded portion to determine if it is malicious comprises checking whether a previously decoded portion of the structure file meets at least one condition.

13. A non-transitory computer-readable medium containing computer executable instructions that, when executed by a processor, cause the processor to perform a method for analyzing a structured file which is not known to be free of or contain malicious content for malicious content, the method comprising:

parsing the structured file into a plurality of portions;

selecting a selected portion of the plurality of portions;

checking the selected portion to determine if at least one pre-condition is met, wherein the at least one pre-condition is the selected portion having one of a given name, a given file extension, and a given file type; and in response to determining that the at least one pre-condition is met:

decoding the selected portion to form a decoded portion; and checking the decoded portion to determine if it is malicious.

14. The non-transitory computer-readable medium of claim 13, wherein the at least one pre-condition can be changed.

15. The non-transitory computer-readable medium of claim 13, wherein the structured file is an XML file.

16. The non-transitory computer-readable medium of claim 13, wherein the selected portion is a file.

17. The non-transitory computer-readable medium of claim 13, wherein checking the decoded portion to determine if it is malicious comprises checking whether a previously decoded portion of the structure file meets at least one condition.

\* \* \* \* \*